P. J. DONOVAN.

SHOCK LOADER.

APPLICATION FILED NOV. 18, 1912.

Reissued Mar. 17, 1914.

13,700.

4 SHEETS—SHEET 1.

Witnesses:
Clarence Young.
Mai Downey.

Inventor
Patrick J. Donovan
By Clarence Young
Attorney.

P. J. DONOVAN.

SHOCK LOADER.

APPLICATION FILED NOV. 18, 1912.

Reissued Mar. 17, 1914.

13,700.

4 SHEETS—SHEET 2.

Witnesses:
Cassius E. Young
May Downey.

Inventor,
Patrick J. Donovan
By Clifford & Young
Attorneys.

NORRIS PETERS INC. LITHO. WASHINGTON, D. C.

P. J. DONOVAN.

SHOCK LOADER.

APPLICATION FILED NOV. 18, 1912.

Reissued Mar. 17, 1914.

13,700.

4 SHEETS—SHEET 3.

Witnesses:
Chauncey Young.
May Doheney.

Inventor.
Patrick J. Donovan
By Upland & Young
Attorneys

P. J. DONOVAN.

SHOCK LOADER.

APPLICATION FILED NOV. 18, 1912.

Reissued Mar. 17, 1914.

13,700.

4 SHEETS—SHEET 4.

Witnesses:
Edward E. Young
May Downey.

Inventor
Patrick J. Donovan
By Clifford E. Young
Attorney.

UNITED STATES PATENT OFFICE.

PATRICK J. DONOVAN, OF COLLINS, WISCONSIN.

SHOCK-LOADER.

13,700. Specification of Reissued Letters Patent. Reissued Mar. 17, 1914.

Original No. 1,032,124, dated July 9, 1912, Serial No. 643,174. Application for reissue filed November 18, 1912. Serial No. 732,174.

*To all whom it may concern:*

Be it known that I, PATRICK J. DONOVAN, a citizen of the United States, residing at Collins, in the county of Manitowoc and State of Wisconsin, have invented a new and useful Shock-Loader, of which the following is a specification.

My invention relates to new and useful improvements in shock loaders and my object is to provide a device of this character wherein the reel carrying the picker forks is provided with means to compensate for obstructions which may be met in the operation thereof.

A further object of the invention resides in the provision of a reel formed in sections, the sections of which are provided with raking or picking teeth and are also hinged individually to the main frame of the reel.

A still further object of the invention resides in providing spring members in connection with the hinged sections of the reel whereby the same are hingedly held thereon and still another object resides in the provision of a spring member for every two opposed sections.

Still another object of the invention resides in the provision of hinged plates upon which the shock is adapted to be thrown as the same is raked or picked from the ground, said plate being adapted to throw the shock from the reel to an endless carrier.

A still further object resides in providing a device which is extremely simple in construction, thereby readily and cheaply manufactured and one which is very effective and useful in operation.

With these and other objects in view, my invention consists in the novel features of construction, combination and arrangement of parts as will be hereinafter referred to and more particularly pointed out in the specification and claims.

Figure 1:
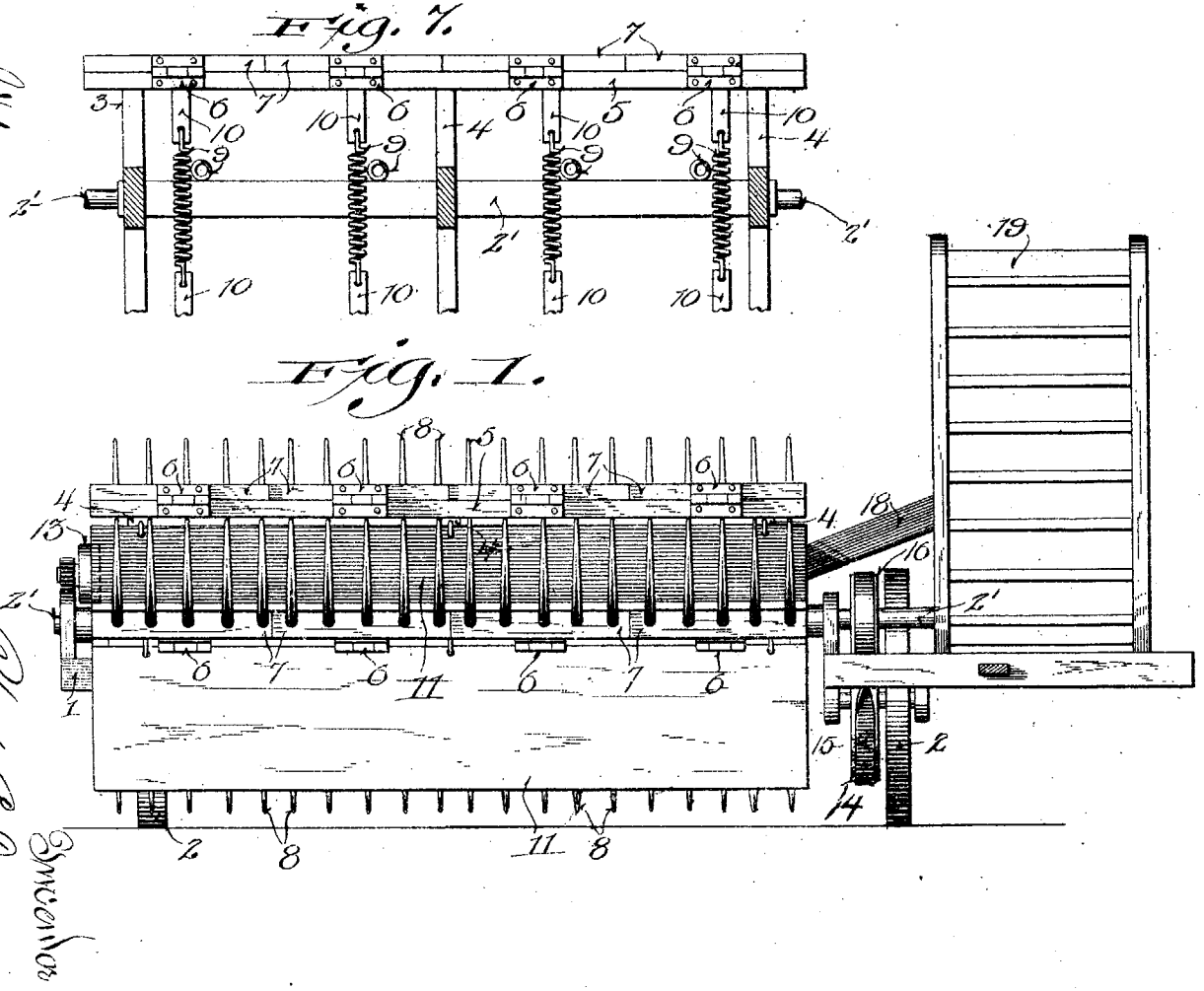
Figure 2:
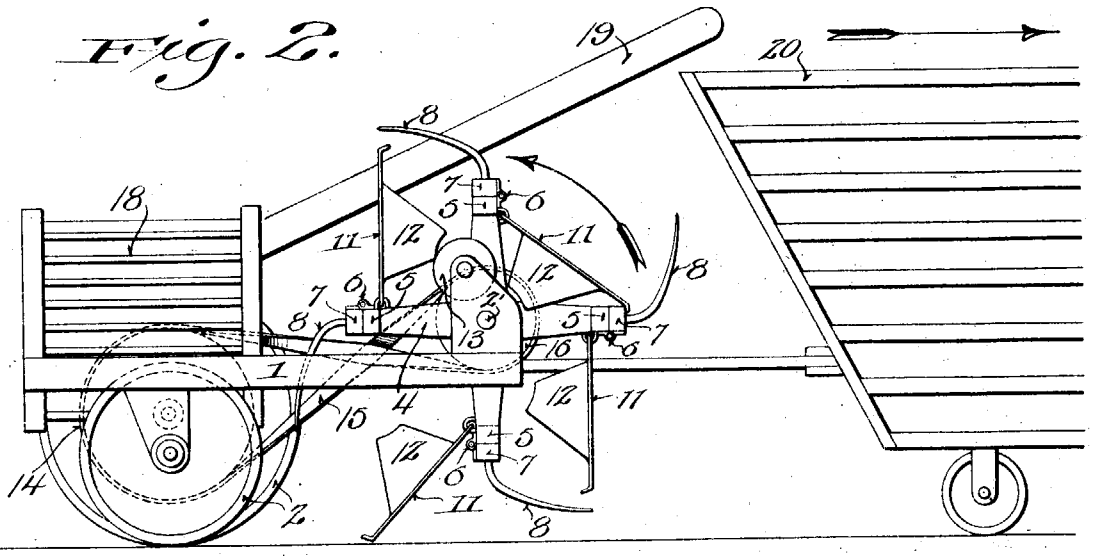
Figure 5:
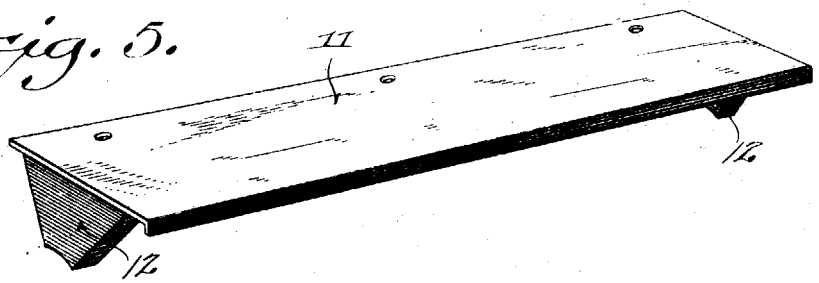
Figure 3:
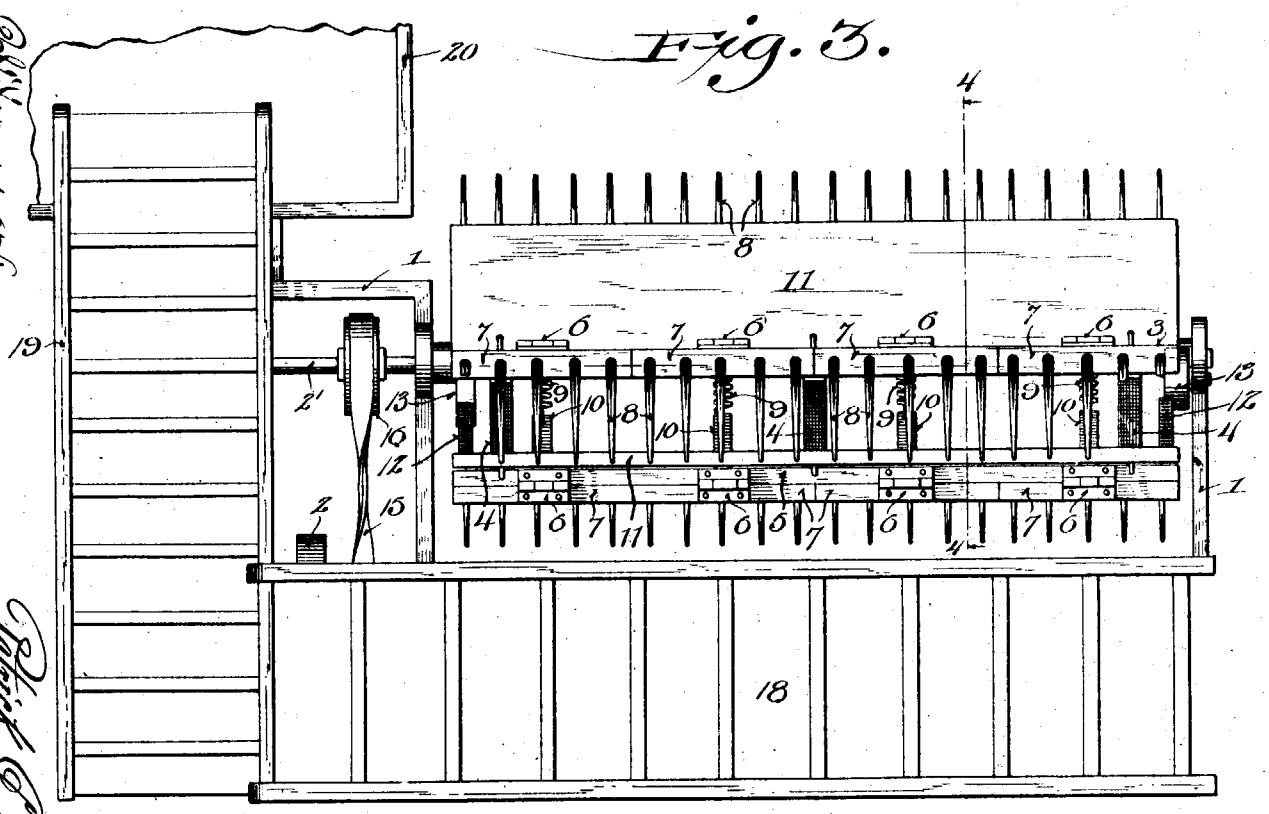
Figure 4:
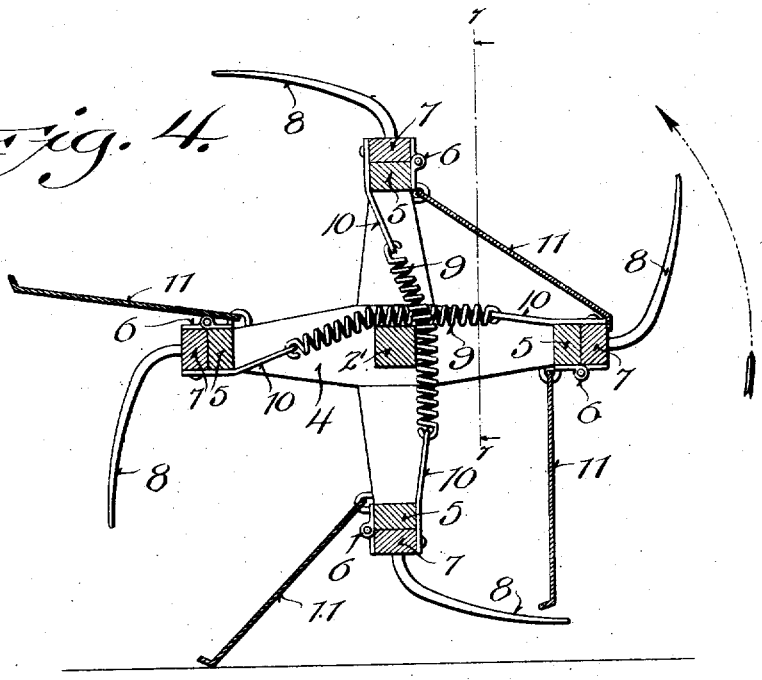
Figure 6:
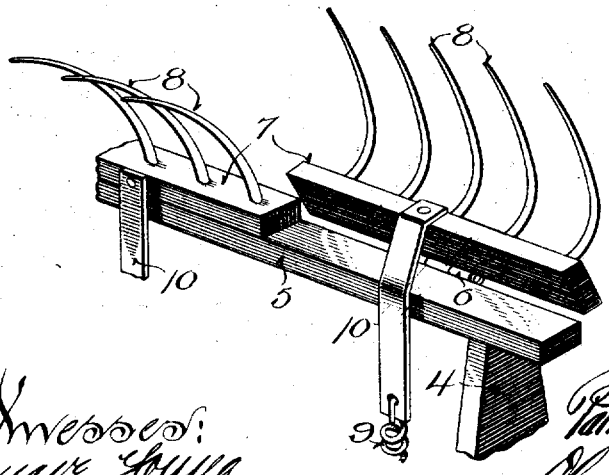

In the accompanying drawings, forming a part of this application: Figure 1 is a front elevation of the device; Fig. 2 is a side elevation thereof; Fig. 3 is a top plan view thereof; Fig. 4 is a transverse section as seen on line 4—4 Fig. 3; Fig. 5 is a detailed perspective view of one of the hinged plates carried on the reel; Fig. 6 is a fragmentary perspective view of the reel with the sectional bars thereon, and Fig. 7 is a section as seen on line 7—7, Fig. 4, with the hinged plate removed.

In carrying out my invention I shall refer to the drawings in which similar reference characters represent corresponding parts throughout the several views and in which—

1 indicates a frame of any desired size mounted on the supporting wheels 2 and within the forward portion of which is rotatably mounted a shaft 2′, said shaft extending from one side of said frame to a point adjacent the opposite side. The shaft 2′ forms a central character about which is formed a reel 3, said reel comprising the radial bars 4 and the horizontal peripheral bars 5 mounted on the ends of said radial bars.

Hingedly mounted on the horizontal peripheral bars 5 through the medium of the hinges 6 are the sectional bars 7, said latter bars being arranged in alinement on the outer faces of the bars 5 extending the full length thereof. The sectional bars 7 are each provided with a plurality of arcuately designed raking or picker teeth 8, whereby when said reel is rotated the bundles of shock on the ground can be raked or picked therefrom and carried with the reel to a portion on the frame which will be hereinafter more particularly described, and in order to provide means whereby the teeth may yield against obstructions or the like met in their path, a plurality of coil spring bars 9 are provided. These spring bars are arranged so as to rest upon the central bar or shaft 2′ and each end thereof is engaged with one end of a spring metallic strip 10, the opposite ends of said strips being secured to portions of the sectional bars 7. As there is one spring bar provided for each pair of sectional bars, the ends of the spring metallic strips of each spring may be engaged with bars which are arranged on opposed horizontal bars 5 and as the sectional bars 7 on each bar 5 are arranged in circular alinement with respect to the sectional bars or the other horizontal bars, it will be seen that said spring bars are arranged in pairs on the central shaft 2′. Thus it will be seen that as said wheel is rotated, in the direction indicated by the arrow, the teeth carried on the sectional bars will contact with the ground and as obstructions are met in the path thereof, said teeth will yield thereto, through the medium of the springs having coöperation with the sectional bars carrying said teeth, thereby preventing any injury to the teeth, which may occur without the use of such means as above described. Also carried on the reel 3 are a plurality of stripper plates 11, said plates extending the full length of said reel and hingedly mounted thereon, one plate being provided for each horizontal bar 5 thereon. These plates are hinged immediately adjacent said horizontal bars and each plate is adapted to cooperate with the teeth carried on the succeeding horizontal bar when the device is in operation. The said plate is of a width substantially equal to the distance between any two horizontal bars and the underface of each plate is provided at its ends with the arms 12, while the frame has mounted thereon adjacent the bearing shaft 2′ a roller 13 adapted to coöperate with said arms 12 as the reel is rotated. One of the supporting wheels 2 has mounted thereon a pulley 14 over which extends a belt 15, said belt being also extended over a similar pulley 16 carried on the shaft 2′ in alinement with said pulley 14 whereby it will be seen that as the frame 1 is propelled, the reel 3 will simultaneously be rotated. The frame 1, as shown in Fig. 2, is connected to the rear end of a wagon having a rack body 20, the loader constituting a trailer that is attached to and drawn by the forwardly disposed vehicle, which vehicle travels in the direction as indicated by the arrow.

Disposed on the frame 1 immediately forward of the reel 3 and extending transversely thereof is an endless carrier 18, one end of said carrier leading to an additional carrier or conveyer 19, said latter conveyer extending upwardly and forwardly of the frame 1 to empty its contents in the rack 20. Through this construction it may be seen that the bundles or shock which are raked from the ground by means of the teeth on the reel will be thrown upon the conveyer 18 from whence they are conducted through the medium of the additional conveyer 19 to the rack.

In operation it will be seen that as the machine travels forwardly, the reel 3 will be caused to rotate and the bundles or shock, which are usually arranged in rows on the field, are picked up by the teeth on the reel and emptied onto the conveyer 18. As the reel is rotated, however, and each row of teeth comes in contact with a bundle, the hinged plate which is carried on the succeeding horizontal bar is forced backward, by the impact of the bundle in such position that its free end will rest at a point adjacent to the base of the teeth, while said bundle is lifted by the latter. Upon the continued rotation of the reel, each plate will remain in the position described until the row of teeth with which it coöperates reaches the highest point in the rotative movement of the reel, whereupon the plate arms 12 will engage the roller 13, such engagement causing said plate to quickly swing backward, whereby the bundle resting thereagainst will be thrown upon the elevator 18. As stated before, the bundles are conveyed from the carrier 18 to the additional carrier or conveyer 19 from where they are carried to a point above the rack 20 into which they are emptied. In the rotation of the wheel 3 however it may happen that the teeth meet certain obstructions such as large stones, boulders, and the like, and in order to prevent the teeth from becoming injured or damaged in any manner whatsoever the spring members are provided which coöperate with the sectional bars to which the teeth are attached to allow said sectional bars to yield against these obstructions. The yielding of the sectional bars will allow the teeth to ride gently over the obstructions and as soon as freed from said obstructions, the teeth will return to their normal positions through the tension of said spring members.

Although I have particularly described the various features of my invention, it will be readily understood that various changes in form, proportion and in the minor details of construction may be resorted to without departing from the spirit or sacrificing any of the principles of the invention.

From the foregoing it will be seen that I have provided an improved shock loader wherein a reel is provided for the collection of the bundles, the teeth on said reel being arranged to yield when meeting obstructions in the path thereof. Furthermore it will be observed that this reel is provided with hinged sectional bars to which the teeth are secured, thereby arranging the teeth in sections. It will still further be seen that I have provided a plurality of spring bars each one of which is adapted to coöperate with a pair of sectional bars arranged on opposed sides of the reel. It will further be seen that I have also provided stripping means that are adapted to cooperate with the teeth of the reel to strip the bundles or shock therefrom. It will still further be seen that I have provided a device of comparatively simple construction, whereby the same may be inexpensively manufactured, and one which is very effective and useful in operation.

Having thus described the invention what is claimed is:—

1. In a shock loader of the class described, the combination with a frame supported on wheels; of a reel rotatably mounted thereon, a plurality of sectional bars hingedly carried on the periphery of said reel, the sections of said bars being arranged end to end thereon, a plurality of teeth carried on the sectional bars, and means to yieldingly retain said sectional bars in position on the reel.

2. In a shock loader of the class described, the combination with a frame supported on wheels; of a reel rotatably mounted on said frame, a plurality of sectional bars hingedly carried on said reel, the sections of said bars being arranged end to end thereon, teeth carried on said sectional bars and a plurality of spring members coöperating with said sectional bars to yieldingly support the same on the reel.

3. In a shock loader of the class described, the combination with a frame supported on wheels; of a reel rotatably mounted on said frame, a plurality of sectional bars hingedly mounted on the periphery of said reel, the sections of said bars being arranged end to end thereon, a plurality of teeth carried on each of said bars and a plurality of spring members adapted to coöperate with the sections of said bars to yieldingly support the same on the reel, each spring member co-acting with a pair of sections of bars arranged on opposite sides of the reel.

4. In a machine of the class described, the combination with a frame supported on wheels; of a reel rotatably supported on the frame, a plurality of teeth carried on said reel and arranged in rows thereon, and a plurality of plates hingedly carried on said reel and in position to coöperate with the rows of teeth thereon.

5. In a device of the class described, the combination with a frame supported on wheels; of a reel rotatably mounted thereon, said reel comprising a central shaft, radial bars and peripheral bars, sectional bars hingedly carried on the peripheral bars of said reel, the sections thereof being arranged end to end thereon, teeth carried on said sectional bars and spring bars coöperating with said sectional bars to yieldingly support the same on said reel, each spring bar coacting with sections of bars arranged on the opposite peripheral bars of the reel.

6. In a device of the class described, the combination with a frame supported on wheels; of a reel rotatably carried on said frame comprising a central shaft, radial bars and peripheral bars, sectional bars hingedly mounted on said peripheral bars and having the sections thereof arranged end to end thereon, teeth carried on said sectional bars, a plurality of coil springs disposed across the central shaft of the reel, spring strips having one of their ends engaged with the springs, the opposite ends of said strips being secured to sectional bars arranged on the opposite peripheral bars of the reel and means to revolve said reel.

7. In a device of the class described, the combination with a frame supported on wheels; of a reel rotatably mounted thereon, said reel comprising a central shaft, radial bars and peripheral bars, a plurality of sectional bars hingedly carried on said peripheral bars and having the sections thereof arranged end to end thereon, teeth carried on the sectional bars, coil spring bars resting across said central shaft, spring strips engaged with the ends of said spring bars and also secured to sectional bars arranged on the opposite peripheral bars of the reel, and a plurality of plates also hingedly carried on said reel and adapted to coöperate with the teeth thereon.

8. In a device of the class described, a reel comprising a central shaft, radial bars thereon, horizontal peripheral bars secured to the ends of said radial bars, a plurality of sectional bars hingedly secured to the outer faces of said peripheral bars, picker teeth carried on said sectional bars, and means to yieldingly retain said sectional bars in their normal positions against the outer faces of the peripheral bars.

9. A reel of the class described, comprising a central shaft, radial bars thereon, horizontal peripheral bars secured to said radial bars, rows of teeth carried on the peripheral bars, and a plate hingedly carried on each of said peripheral bars and in position to coöperate with the teeth on the succeeding bar as said reel is revolved.

In testimony that I claim the foregoing as my own, I have hereto affixed my signature in the presence of two witnesses.

PATRICK J. DONOVAN.

Witnesses:
W. H. DAMM,
WM. REIMER.

Copies of this patent may be obtained for five cents each, by addressing the "Commissioner of Patents, Washington, D. C."